United States Patent [19]
Prochazka

[11] 3,901,531
[45] Aug. 26, 1975

[54] SAFETY MECHANISM FOR THE OCCUPANTS OF VEHICLES, PARTICULARLY OF MOTOR VEHICLES

[75] Inventor: Arthur Prochazka, Munich, Germany

[73] Assignee: Bayern-Chemie Gesellschaft fur flugchemische Antriebe mit beschrankter Haftung, Aschau, Germany

[22] Filed: Oct. 11, 1973

[21] Appl. No.: 405,694

[30] Foreign Application Priority Data
Oct. 11, 1972 Germany............................ 2249786

[52] U.S. Cl............................................ 280/150 SB
[51] Int. Cl.............................................. B60r 21/10
[58] Field of Search .............. 280/150 SB; 188/1 B; 180/82

[56] References Cited
UNITED STATES PATENTS

| | | | |
|---|---|---|---|
| 3,343,874 | 9/1967 | Hildebrandt ...................... | 188/1 B |
| 3,484,134 | 12/1969 | Townsend ...................... | 280/150 SB |
| 3,804,430 | 4/1974 | Fiala............................. | 280/150 SB |

*Primary Examiner*—Robert R. Song
*Attorney, Agent, or Firm*—Woodhams, Blanchard and Flynn

[57] ABSTRACT

Device for tensioning safety restraining devices for automotive passengers. For an automotive restraining device such as a seat belt, which is tensioned by a pressure cylinder device which is, in turn, actuated by deceleration sensitive devices, there is provided structure for insuring that the tension applied to the restraining device does not exceed a predetermined value. In one embodiment such a device is comprised of a relief valve for venting the pressure fluid from the cylinder at a predetermined value of pressure and in another embodiment the device is comprised of a mechanical relief device interposed between the cylinder and the restraining device.

7 Claims, 4 Drawing Figures

SAFETY MECHANISM FOR THE OCCUPANTS OF VEHICLES, PARTICULARLY OF MOTOR VEHICLES

FIELD OF THE INVENTION

The invention relates to a safety mechanism for the occupants of vehicles, particularly of motor vehicles having a device which is releasable by a sensor for tightening the safety belt, which consists of a working cylinder the piston of which is movable by gas pressure and in connected to the safety belt.

BACKGROUND OF THE INVENTION

In the following discussions the term "safety belt" includes any possible embodiment of a holding mechanism, namely one or more belts of one or multiple belt systems, slings or protective shields which are adjusted to the shape of the body or vestlike wraps which may have two or more, as desired, points of securement.

In the use of safety belts or similar devices by vehicle occupants, it is particularly important upon the occurrence of a collision that the belt be tightened and the endangered person be pulled against his seat, namely that he be secured firmly in position relative to the vehicle. However, such a condition can for reasons of necessary freedom of movement and physical wellbeing not be maintained at all times during a longer trip. Instead, it is common to place a safety belt, which is often considered to be a nuisance anyway, only loosely around the occupant. However, this practice often results on a sudden impact of the vehicle with an obstacle in injuries which would have been avoided if the safety belt or similar device had been worn properly.

A safety belt or the like thus must, in order to be able to meet its duty as a safety mechanism, from the start of any dangerous vehicle deceleration lie against the vehicle occupant with a tension based on the structure of the vehicle. Only in this manner are conditions created so that all forwardly directed inertia forces of the vehicle occupant have available the largest possible free path for the deformation work. The tension of the belt must also be held within definite limits to prevent injuries.

The basic purpose of the invention is to pull the endangered vehicle occupant by means of the safety belt which is placed around him into the seat with only such force as on one hand to insure the greatest possible path to the nearest obstacle lying in front of him, for example the steering wheel or the dashboard, while on the other hand to avoid injury to him through the sudden tightening of the safety belt or the like and/or through a premature expansion or stretching of the belt material.

The invention consists in providing means for limiting the tension which is applied on the safety belt. Thus, according to the invention it is for example possible to relieve in selectable steps the gas pressure causing the piston movements by means of an adjustable safety valve.

This assures that the necessary force limitation takes place not alone by choosing the dimensions of the gas generator, etc. but also that additional means limit the piston movement.

The means for limiting said force can according to a different version of the invention also consist in providing a mechanically acting power-limiting means between the piston and the safety belt.

According to the invention the power-limiting means includes a resilient stop for limiting the piston path upon its reaching its maximum force through the action of which the person against whom the belt is to be tightened is pulled back carefully rather than suddenly.

As one flexible stop according to the invention there can be used a gas spring for damping the piston movements, which gas spring is located in the rear cylinder half behind the piston during its movement and which for avoiding unbalanced movements can be relieved at an appropriate time by means of a relief valve in the cylinder base. A damping of the piston movement can also take place in other conventional ways, for example by padding the rear cylinder chamber with a flexible material, such as a cellular structure, or by arrangement of a damping plate within the cylinder which is supported by pressure springs relative to the cylinder end.

Further according to the invention, it is advantageous to construct the damping member adjustably so that the amount of such damping can be selected corresponding to the weight of the vehicle occupant who is to be pulled into the seat by the holding mechanism and is adjustable on a scale.

In using the safety mechanism of the invention it is possible to use to full advantage the entire available path from the seat of the vehicle occupant to the next obstacle ahead of him, for example the steering wheel or the dashboard, to thus diminish in an acceptable manner the inertia forces which appear in the case of a sudden deceleration, as on impact of the vehicle with an obstacle, thus to catch the endangered person and to avoid fatal injury.

BRIEF DESCRIPTION OF THE DRAWINGS

The invention will be explained in connection with exemplary embodiments in the drawings which will be described hereinafter. The drawings are limited to a schematic illustration of the parts which are needed to understand the invention.

In the drawings.

DETAILED DESCRIPTION

Figure 1:
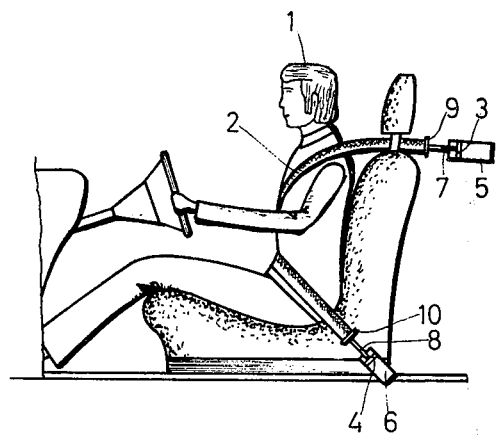
FIG. 1 illustrates a buckled-up occupant of a motor vehicle in driver position.

FIG. 1 illustrates a motor vehicle driver in the normal position 1. The safety belt 2 is placed around the driver relatively loosely and the driver does not sit confined and is not pressed against his seat. The pistons 3, 4 of both working cylinders 5, 6 are in a loose position so that the piston rods 7, 8 with the connected belt ends 9, 10 are extended. The belt 2 is placed around the vehicle occupant 1 in such a manner that same has a sufficient freedom of movement to assure his comfort.

Figure 2:
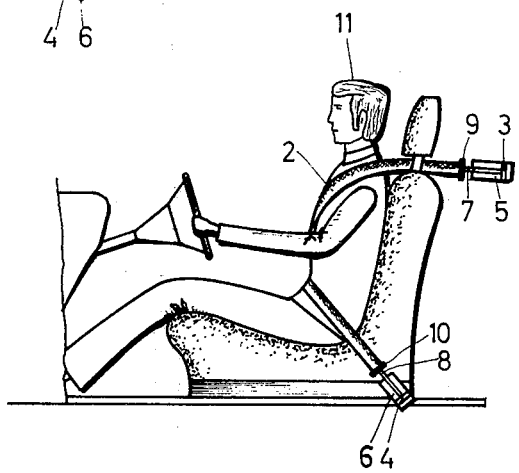
FIG. 2 illustrates the vehicle occupant according to FIG. 1 after tightening the safety belt, such as upon a sudden deceleration of the vehicle.

FIG. 2 illustrates the driver in position 11 directly after a sudden deceleration, for example one caused by an impact of the vehicle against an obstacle. The belt 2 has pulled the driver firmly back into the seat. Through ignition of gas producers, which are not illustrated in FIG. 1, in the front chambers of the working cylinders 5 and 6, through which chambers the piston rods extend, the pistons 3, 4 are retracted and have tightened the ends 9, 10 of the belt.

Figure 3:
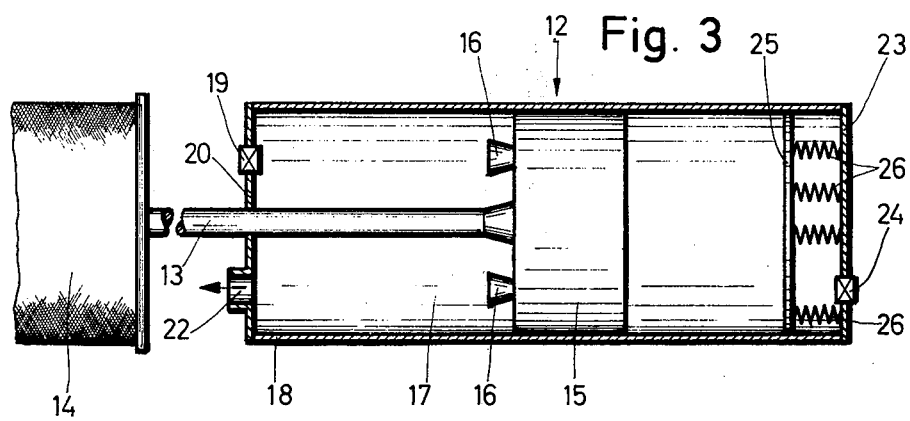
FIG. 3 illustrates approximately in a actual size a piston-cylinder unit for tightening the safety belt.

FIG. 3 illustrates a working cylinder 12 in an approximately actual size. The safety belt 14 is connected to the outer end of the piston rod 13. Rocket boosters 16 (gas producers) are inserted in the piston 15 and are ignitable through a notillustrated switching member which is activated upon a sudden deceleration of the vehicle. This in a known manner builds up a pressure in the chamber 17 of the cylinder 18. The adjusting valve 19 permits an exact adjustment of the pressure corresponding to the weight of the particular person to be accommodated in the seat. The pressure remains constant because the driving mechanism burns during the entire collision and a constant pressure balance takes place through the opening 22 and the relief pressure valve 19 in the cylinder lid 20. If the selected force is exceeded, the valve 19 opens. At the same time that the piston moves forwardly, the buckled-up person does likewise. As soon as the pressure diminishes, the valve 19 closes and the driver is again pulled back into the seat.

A gas exhaust pipe which leads to the outside is connected to the opening 22 in the cylinder lid 20 and the exhaust gases of the rocket booster 16 are discharged therethrough. The end of the cylinder 18 is provided with a cover 23 which has a further adjustable relief opening 24, the adjustable magnitude of which permits a widely selectable damping of the piston movements. The piston path is moreover limited by a plate 25 which is supported flexibly by pressure springs 26 relative to the cover 23. Said plate illustrates a resilient stop for the piston when the piston path is long.

In place of the recoil principle which was used in the above-described exemplary embodiment, in which one or more rocket boosters are utilized as gas producers, a closed system is also possible in which a pressure balance is achieved between the cylinder chambers on both sides of the piston and the gas producer is supported either in the cylinder end or on the cylinder wall.

Good test results were also achieved by using a different system which operates according to the so-called cannon launching principle, in which system the piston is also driven by means of a gas producer; the highest pressure which is applied on the belt is here, however, adjustable by means of a mechanically operating power-limiting means.

Figure 4:
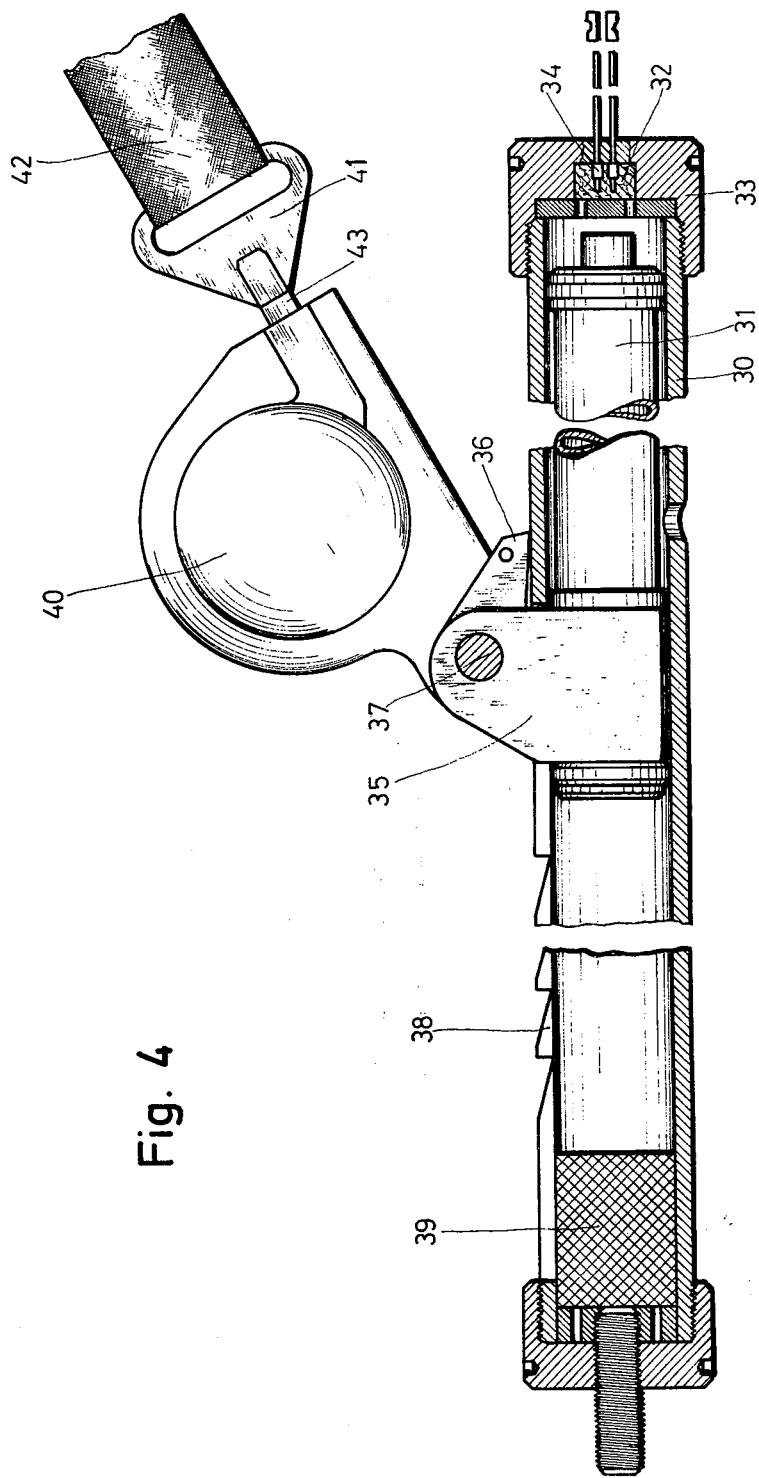
FIG. 4 illustrates a different piston-cylinder unit with as associated mechanical force-limiting means.

FIG. 4 illustrates this mechanism.

The piston 31 is supported longitudinally movably in the cylinder 30. Its longitudinal movement occurs by means of a propellant charge 32 which lies in a recess of the cylinder end 33 and which is ignited by the fuses 34 in response to the notillustrated sensor upon occurrence of a sudden deceleration of the vehicle. A pawl 36 is supported pivotably about the pivot point 37 on a guide arm 35 located at the opposite end of the piston 31. The pawl 36 engages teeth 38 on the outside of the cylinder 30 during movement of the piston and locks the extended piston in a displaced position.

The cylinder end is formed by a layer 39 comprising a honeycombed structure of flexible material. Same has the function of damping the piston movement during extremely long piston paths.

An adjustable force-limiting means 40 of a known type, such as that published in U.S. Pat. Nos. 2,161,820 and 3,547,468, engages the pivot point 37 of the pawl 36. Said force-limiting means is moved together with the piston 31. The end of the belt 42 is connected to the loop traction eye 41 of the force-limiting means 40. If a selected tension, which can be adjusted on the force-limiting means 40, is exceeded, the holding member 43 of the loop traction eye 41 moves out of the housing of the forcelimiting means 40, whereby the applied energy is altered and the pressure on the buckled-up person is diminished.

Although particular preferred embodiments of the invention have been disclosed above for illustrative purposes, it will be understood that variations or modifications thereof which lie within the scope of the appended claims are fully contemplated.

The embodiments of the invention in which an exclusive property or privilege is claimed are defined as follows:

1. In a safety belt tensioning apparatus for holding the occupant of a vehicle securely in position in the event of a collision, said safety tensioning apparatus having cylinder means and a piston reciprocably mounted in said cylinder means, said piston being connected to said safety belt, the improvement comprising gas propellant means for effecting a movement of said piston in one direction in said cylinder means in response to a collision event to effect a tightening of said safety belt holding said occupant, force-limiting means for controlling the tightening force generated by said gas propellant means and said piston on said safety belt to a predefined maximum force and damping means for controlling the rate of deceleration of said movement of said piston in said cylinder means.

2. The improved safety belt tensioning apparatus according to claim 1, wherein said force-limiting means is connected between said piston and said safety belt.

3. The improved safety belt tensioning apparatus according to claim 1, wherein said gas propellant means includes a propellant charge located on one side of said piston whereby upon an activation of said propellant charge a gas propellant is generated to effect said movement of said piston.

4. The improved safety belt tensioning apparatus according to claim 1, wherein said damping means include a honeycombed structure of flexible material mounted in the path of movement of said piston.

5. The improved safety belt tensioning apparatus according to claim 1, wherein said damping means include a gas valve in one end of said cylinder means for controlling the amount of gas escaping between said piston and said one end of said cylinder means as said piston is moved by said gas propellant means toward said one end.

6. The improved safety belt tensioning apparatus according to claim 1, wherein said damping means include means for adjusting said damping rate to thereby adjustably control said rate of deceleration of said piston.

7. The improved safety belt tensioning apparatus according to claim 1, wherein said damping means include stop means mounted in the path of said piston and locking means for locking said piston in a fixed displaced position at the termination of said movement thereof in said one direction.

* * * * *